United States Patent
Daugaard et al.

(10) Patent No.: US 8,268,271 B2
(45) Date of Patent: Sep. 18, 2012

(54) CATALYTIC MOVING BED FILTER

(75) Inventors: Daren E. Daugaard, Skiatook, OK (US); Samuel T. Jones, Dewey, OK (US)

(73) Assignees: Iowa State University Research Foundation, Inc., Ames, IA (US); Phillips 66 Company, Houston, TX (US)

(*) Notice: Subject to any disclaimer, the term of this patent is extended or adjusted under 35 U.S.C. 154(b) by 8 days.

(21) Appl. No.: 12/914,950

(22) Filed: Oct. 28, 2010

(65) Prior Publication Data

US 2011/0182788 A1 Jul. 28, 2011

Related U.S. Application Data

(60) Provisional application No. 61/255,522, filed on Oct. 28, 2009.

(51) Int. Cl.
*B01D 37/00* (2006.01)
*B01D 39/00* (2006.01)
*B01D 53/83* (2006.01)
*B01D 53/86* (2006.01)
*B01J 35/00* (2006.01)

(52) U.S. Cl. .............. 423/210; 252/182.11; 252/182.32; 95/107; 95/275; 95/276; 95/277; 95/278; 95/285; 55/474; 55/479

(58) Field of Classification Search .................. 423/210; 252/182.11, 182.32; 95/107, 275, 276, 277, 95/278, 285; 55/474, 479
See application file for complete search history.

(56) References Cited

U.S. PATENT DOCUMENTS

| | | |
|---|---|---|
| 4,487,682 A | 12/1984 | Clarke et al. |
| 4,609,539 A | 9/1986 | Horecky et al. |
| 6,235,958 B1 * | 5/2001 | Commereuc et al. ......... 585/647 |
| 7,108,939 B2 | 9/2006 | Suzuki et al. |
| 7,309,384 B2 | 12/2007 | Brown et al. |
| 2010/0200810 A1 * | 8/2010 | Schmidt et al. ............... 252/373 |

FOREIGN PATENT DOCUMENTS

| | | |
|---|---|---|
| JP | 51-129871 A * | 11/1976 |
| WO | PCT/US10/54488 | 1/2011 |

* cited by examiner

*Primary Examiner* — Timothy Vanoy
(74) *Attorney, Agent, or Firm* — Boulware & Valoir

(57) ABSTRACT

The present invention relates generally to a method for removing contaminants from a fluid stream and chemically upgrading the stream at the same time. More particularly, the invention relates to a catalytic moving bed filter for removing contaminants from a gas or vapor stream and to compositions comprising both moving bed filter materials and one or more catalysts intimately admixed therewith.

20 Claims, 3 Drawing Sheets

CATALYTIC MOVING BED FILTER

CROSS REFERENCE TO RELATED APPLICATIONS

This application claims priority to U.S. Provisional Application No. 61/255522, filed Oct. 28, 2009, incorporated herein in its entirety.

FEDERALLY SPONSORED RESEARCH STATEMENT

Not applicable.

REFERENCE TO MICROFICHE APPENDIX

Not applicable.

FIELD OF THE INVENTION

The present invention relates generally to a moving granular bed catalytic filter for removing contaminants from fluid streams and for simultaneously reacting the components of the fluid stream.

BACKGROUND OF THE INVENTION

There are numerous processes that result in the undesirable entrainment of particulates or other contaminants within a fluid stream that are preferably removed for various purposes. For example, contaminants are removed from a gas or liquid streams in order to meet environmental regulations, to recover the entrained materials for sale or reuse, or to upgrade the gas or liquid stream for its intended purpose. The removal of contaminant materials from a fluid stream is also required in numerous petroleum, chemical, and biofuel applications, including the following: solids are removed in a biomass gasification plant from the exhaust gas stream; fly ash is removed from the exhaust gas stream of a coal-fired power plant in order to meet applicable pollution regulations; sulfur dioxide gas is also removed from the same exhaust stream from the coal-fired power plant; and any process in which a gas or vapor reacts with a solid, such as in a fluidized bed reaction vessel of a chemical process or in a catalytic process at a petroleum refinery.

One method for contaminant removal is the "moving granular bed filter" or "MGBF." MGBF employs a moving bed of filter media to remove contaminants from fluid streams. The major development of the moving bed filter was to allow the bed material to move continuously down through the filter vessel and be carried back up to the top and through a cleansing zone before reuse. Such filters provide better cleansing of the bed and the filter is truly continuous, never needing to be shut down for backwash.

An exemplary moving bed filter is illustrated in FIG. 1 below. Fluid e.g., raw water, is fed in (1) and (2) evenly distributes the flow into the bed. The water flows through the sand bed and exits overflow weir (5). The sand bed moves continuously down, being sucked from the bottom by airlift pump (6), carried upward, and washed in washer (7). Also shown are vessel (3), air diffuser (9), and sludge weir (10).

Moving or fluid bed catalysts are also known, and offer the same advantages of continuous catalyst regeneration without the need to shut down the system. Catalytic filters are also known, but these are typically solid filters. However, heretofore, no-one has ever combined both processes into a single "moving bed catalytic filter."

One application where moving granular bed filters have been successfully employed at high temperatures and pressures is in biomass gasification plants that produce synthesis gas and fast pyrolysis plants that produce pyrolysis oils. "Pyrolysis oil," also known as "bio-oil," is an intermediate fuel under investigation as substitute for petroleum. It is extracted by biomass to liquid technology of destructive distillation from dried biomass in a reactor at temperature of about 500° C. with subsequent cooling. Generally speaking, fast pyrolysis has three main products which include bio-oil, char and various gases that are not condensable except at extreme conditions ($H_2$, $CO$, $CO_2$, $CH_4$). The char and non-condensable gases may be recovered and burned to supply energy to the system, but the condensable gases are rapidly cooled to form condensate droplets that can then be separated from the non-condensable gases due to the substantial difference in density. The composition of two exemplary bio-fuels produced by fast pyrolysis is shown below:

| Source: Piskorz, J., et al. In Pyrolysis Oils from Biomass, Soltes, E. J., Milne, T. A., Eds., ACS Symposium Series 376, 1988. | White Spruce | Poplar |
|---|---|---|
| Moisture content, wt % | 7.0 | 3.3 |
| Particle size, μm (max) | 1000 | 590 |
| Temperature | 500 | 497 |
| Apparent residence time | 0.65 | 0.48 |
| Product Yields, wt %, m.f. | | |
| Water | 11.6 | 12.2 |
| Gas | 7.8 | 10.8 |
| Bio-char | 12.2 | 7.7 |
| Bio-oil | 66.5 | 65.7 |
| Bio-oil composition, wt %, m.f. | | |
| Saccharides | 3.3 | 2.4 |
| Anhydrosugars | 6.5 | 6.8 |
| Aldehydes | 10.1 | 14.0 |
| Furans | 0.35 | — |
| Ketones | 1.24 | 1.4 |
| Alcohols | 2.0 | 1.2 |
| Carboxylic acids | 11.0 | 8.5 |
| Water-Soluble - Total Above | 34.5 | 34.3 |
| Pyrolytic Lignin | 20.6 | 16.2 |
| Unaccounted fraction | 11.4 | 15.2 |

While the biomass begins with about 2% to about 15% moisture, the oil can have a moisture content ranging from about 10% to about 30% or higher. Further, the high oxygen content makes the oil polar and acidic due to the presence of organic acids and the acidity makes the oil corrosive and difficult to store and transport. The pyrolysis oil also has a tendency to polymerize when heating to relatively low temperatures, and the oil is unstable, reacting with air and degassing.

Thus, pyrolysis oils must be upgraded for use and are generally treated to both stabilize the oil and to reduce the oxygen content. One option for upgrading pyrolysis oil is hydrotreating at mild temperatures (270-280° C.). A low temperature hydrotreatment enables stabilization through reactions like olefin, carbonyl and carboxylic groups reduction. Further hydrotreatment at higher temperatures aims at hydrodeoxygenation of phenols and hydrocracking of larger molecules.

Catalytic hydrotreating of bio-oil uses hydrogen in combination with heterogeneous catalysts, such as $CoMo/Al_2O_3$, $NiMo/Al_2O_3$, or uses catalysts such as HZSM-5 zeolite. One major drawback of using catalysts like $CoMo/Al_2O_3$ is the high hydrogen consumption and high pressures needed, which have a strong negative impact on the process economics. HZSM-5 can be used without hydrogen and at atmospheric pressure. However, the catalyst and bio-oil are rapidly degraded at the high temperatures used and yields are poor.

Thus, current pyrolysis oils are difficult to upgrade to transportation fuels because catalyst life severely decreases due to coking of the bio-oil and/or deposition of large molecules or impurities on the catalyst. Furthermore, upgrading catalysts require frequent regeneration or replacement for sufficient conversion.

What is needed in the art is a method for removing contaminants from an fluid stream from a biomass gasification and/or pyrolysis and other plants, which would also improve the amount and quality of the useful material capable of being produced from the fluid stream. The invention, which combines a moving granular bed filter with catalysis, addresses these needs.

SUMMARY OF THE INVENTION

Certain embodiments of the invention provide a method of removing contaminants from a fluid stream using a moving bed filter that also includes a catalyst. Generally speaking, the invention relates to a method of simultaneously filtering and catalytically reacting a fluid stream, wherein a fluid stream is passed through a moving granular bed filter that also comprises a catalyst, such that the moving granular bed filter removes particulate matter from said fluid stream and the catalyst simultaneously facilitates a useful chemical reaction in said fluid stream.

The invention also relates to a composition comprising a moving granular bed filter intimately admixed with a catalyst, wherein the catalyst can be separate or independent from (but still admixed with) the filter materials, or can be absorbed or adsorbed thereto, or it can be covalently bonded thereto.

The fluid stream can be any gas or liquid that has particular matter entrained therein and that can benefit from chemical modification. Such streams include the gas and oils produced from biomass gasification or pyrolysis plants, but other fluid streams are applicable as described below.

The catalyst can be any material useful for achieving a chemical change in the gas or fluid to be filtered, e.g., an upgrading catalyst. For example, the catalyst can alter the chemical speciation of the fluid stream, the overall acid number, the viscosity, or the oxygen or water content.

The filter material can be any filter material used for moving bed granular filters, for example, sand or gravel. However, many other filter materials are known, and some are described below. It is important, however, that the filter material and catalyst be compatible with each other at the operating conditions of temperature and pressure, and preferably under the regenerating conditions too.

DESCRIPTION OF EMBODIMENTS OF THE INVENTION

Figure 1:
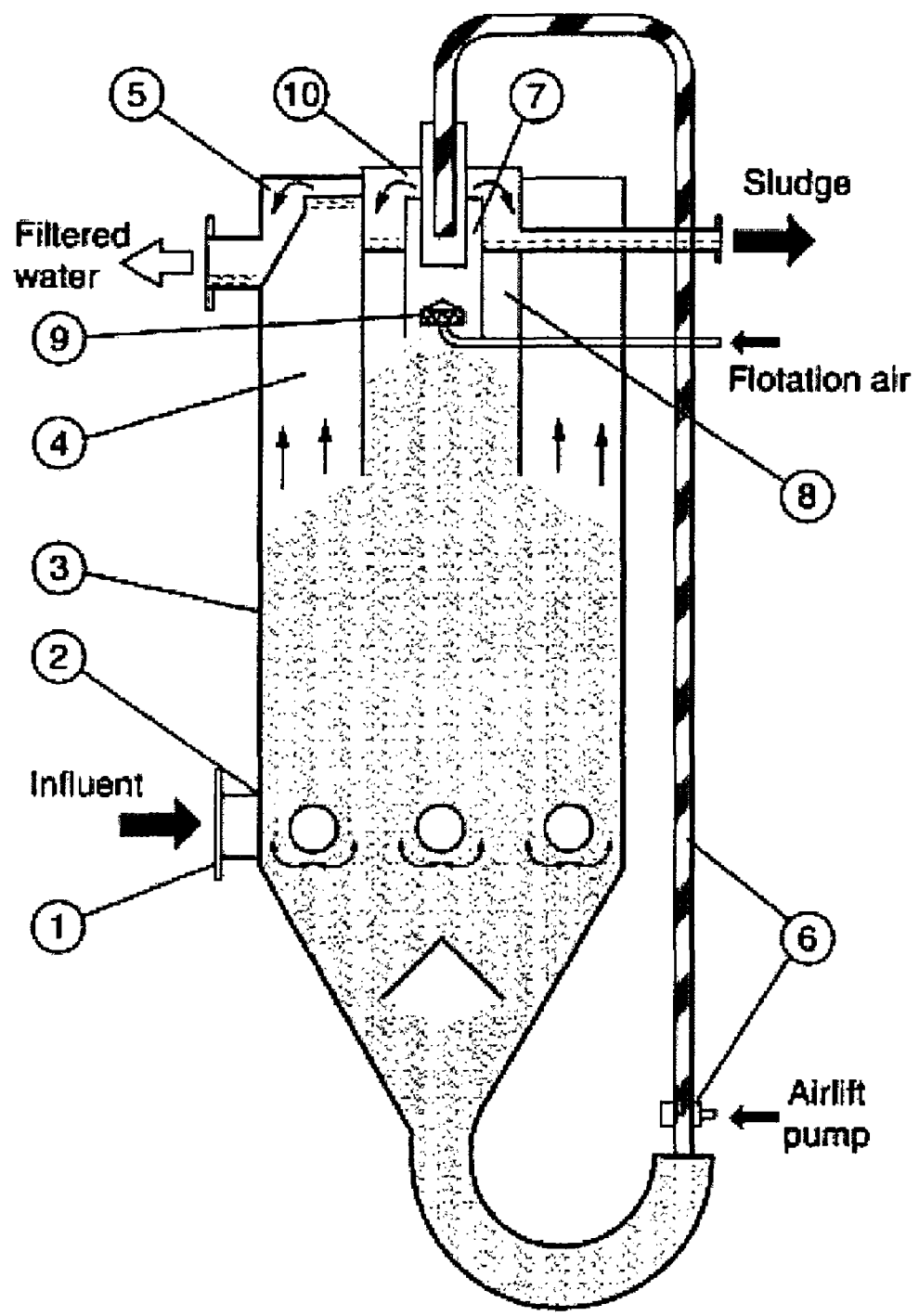
FIG. 1 is an exemplary moving bed filter system.

In one embodiment of the invention, a method of removing contaminants from a gas stream using a moving bed filter including a catalyst is described. The moving bed filter will be a solids separator and the catalyst will chemically alter the organic chemical composition of the stream components in some desired way.

The moving bed filter apparatus may be such as that described below or in U.S. Pat. Nos. 7,309,384 and 6,440,198, hereby incorporated by reference. Other MGBF include U.S. 2005016377, U.S. Pat. Nos. 6,361,701, 5,454,959, 5,462,654, 5,332,562, 5,277,829 and the like.

The bed filter media is selected to be appropriate for the type of contaminant to be removed and for compatibility with the catalyst, and includes sand, gravel, various metals, coal, coke, pelletized ash, pebbles, corundum, limestone, dolomite, glass, soda lime glass, polystyrene, activated charcoal, ceramic, anthracite, garnet, ilmenite, activated charcoal, or packings of various shapes including beads and rods.

For instance, the moving granular bed catalytic filter 100 can be employed to remove fly ash from an exhaust gas stream of a coal-fired powerplant. In such an application, the granular media 108 may be gravel, sand, pelletized fly ash, soda-lime glass beads or other appropriate material. Additionally, if the gas stream is an exhaust gas stream from a coal-fired powerplant, but it is desired to remove sulfur dioxide gas from the gas stream, the granular media 108 may be preferred to be a combination of limestone and dolomite, whereby the granular media will capture the sulfur dioxide from the gas stream by combining with it to form calcium sulfate. In such an application, the media cleaning system 160 may regenerate the calcium sulfate and return the granular media 108 to substantially its original condition for return to the hopper 144. In other applications, the calcium sulfate may simply be discarded.

It is also understood, however, that the moving granular bed catalytic filter 100 may be advantageously configured to remove both sulfur dioxide and fly ash during a single pass of the gas stream 112 through the vessel 104, such as when the granular media 108 is a mixture of limestone and dolomite, with the granular media 108 both capturing the fly ash and combining with the sulfur dioxide to form calcium sulfate. In such a configuration, the media cleaning system 160 may include both a sieving mechanism to remove the fly ash from the calcium sulfate and a regeneration system to regenerate the calcium sulfate. In some embodiments, sand, pebbles or river rock is used as inert bed material. The moving granular bed catalytic filter 100 is preferably operated at temperatures above the dew point of vaporized liquids, preventing tarring of the rocks. Furthermore, if the temperature is too high or the residence time is too long, coking of the moving granular bed catalytic filter 100 may occur.

The catalyst chosen will be dependent on the type of reaction to be performed, but should also be compatible with the filter bed. In many cases, but not necessarily all cases, the catalyst will be a supported catalyst. Refractory materials, such as alumina, silica and silica-alumina, are very suitable as supports. Suitable metals with hydrogenating activity are metals of Groups VI and VIII of the Periodic Table of Elements, such as molybdenum, tungsten, cobalt and nickel. Preference is given to catalysts containing at least one metal of Group VI and at least one metal of Group VIII, e.g., catalysts containing cobalt and/or nickel together with molybdenum and/or tungsten. The metals may be present as such, in the form of compounds, such as oxides, sulphides or other salts. If desired, other elements, such as halogens, e.g. fluorine or chlorine may be present in the catalyst.

Preferred catalysts for cracking tars include calcined dolomite, ICI 46-1, Fr—Cr based LB and Cu—Zn—Al based B202.

The catalyst can be loosely mixed with the bed material or absorbed or adsorbed thereto, or chemically linked thereto, depending on the characteristics of the catalyst and filter bed and the applicational needs. Exemplary catalysts and their reactions are provided below.

| Catalyst | Reaction |
| --- | --- |
| HZSM-5 zeolite | Carbonium ion mechanism promotes deoxygenation, decarboxylation and decarbonylation of the oil constituents, as well as cracking, oligomerization, alkylation, isomerization, cyclization and aromatization |
| $CoMo/Al_2O_3$ & $H_2$ & sulfer $NiMo/Al_2O_3$ & $H_2$ & sulfer | Hydrodeoxygenation |
| 5% Platinum on activated carbon (Pt/C, Across organics) | Hydrodeoxygenation |
| 5% Ruthenium on alumina (Sigma Aldrich) | reduction of all types of oxygen containing organic molecules (aldehydes, ketones, esters and acids) |

Figure 2:
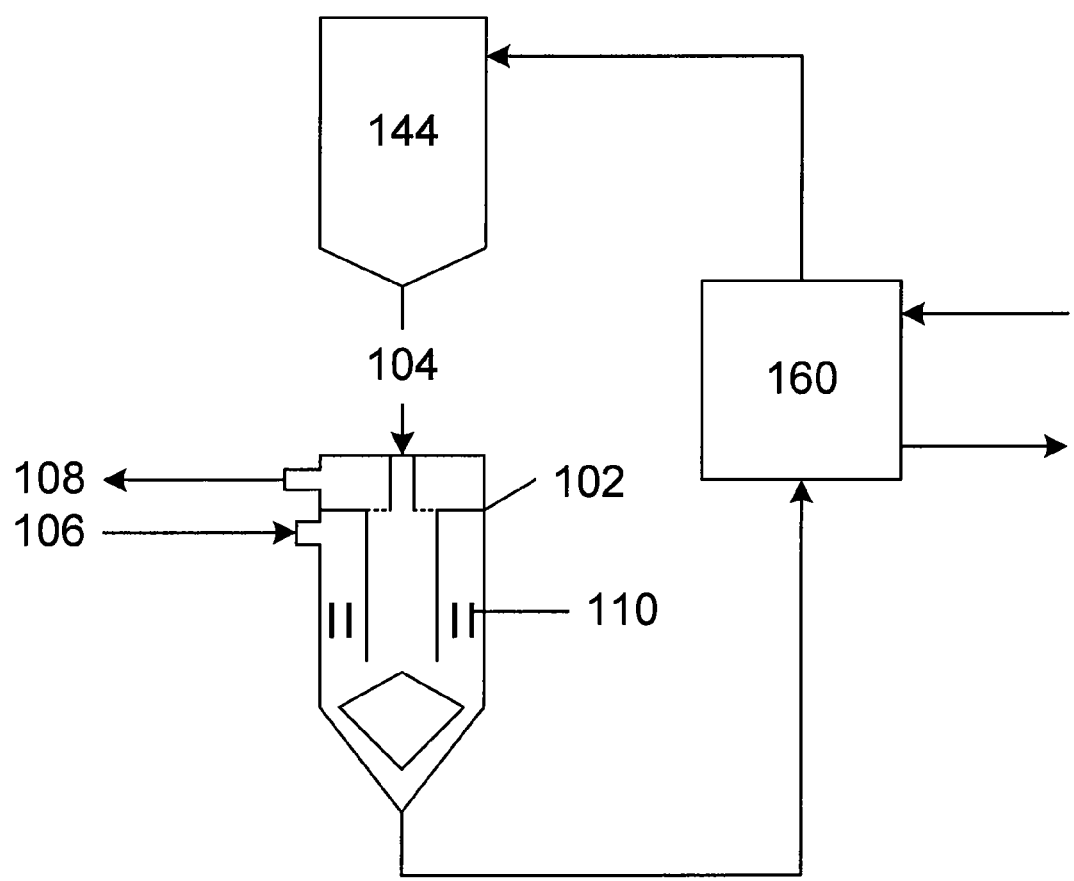
FIG. 2 is an embodiment of a catalytic moving bed filter system.
Figure 3:
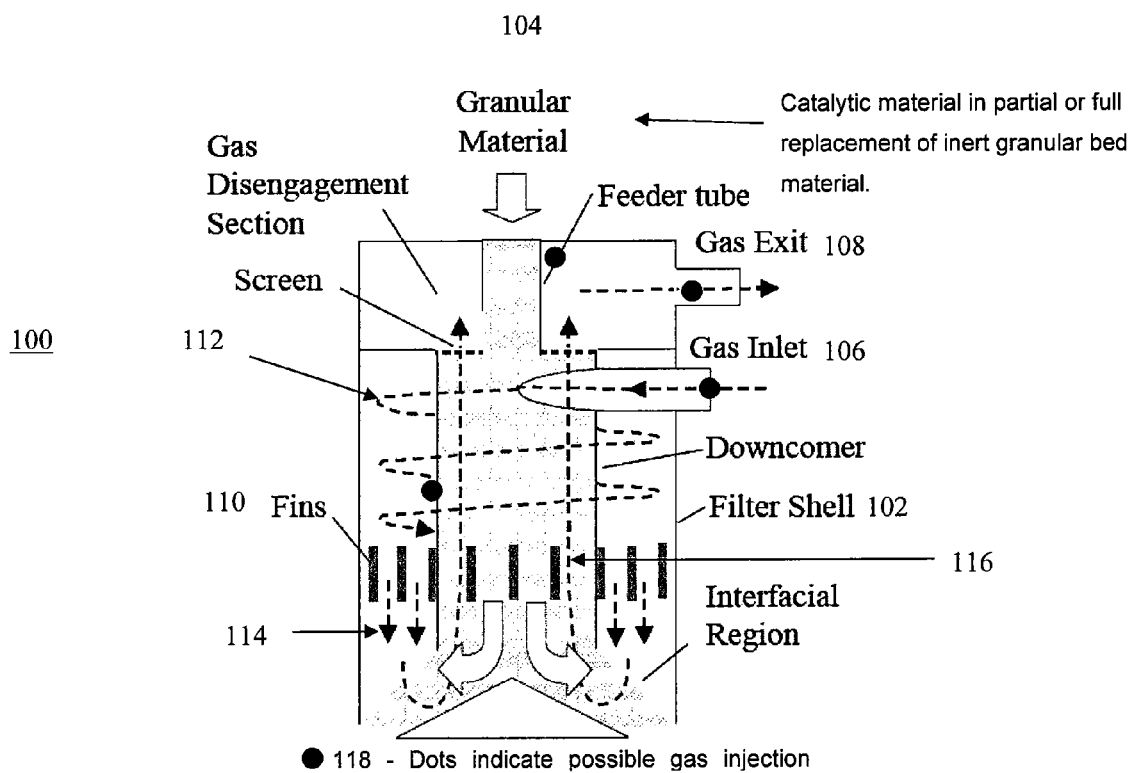
FIG. 3 is an embodiment of a catalytic moving bed filter system illustrating flow paths.

In one embodiment, a typical moving bed catalytic filter 100, as shown in FIGS. 2 and 3, includes a vessel 102 through which a quantity of filter media 104 moves and through which flows a gas stream from an inlet 106 having a quantity of contaminants entrained therein is cleaned of at least a portion of the contaminants by the filter media 104. The gas stream can be any gas, vapor, or combination of gases and/or vapors having one or more contaminants or undesirable material entrained therein. The contaminants can include any solid material (such as char) or any gas or vapor that is desired to be removed from the gas stream. The gas exits the vessel 102 through outlet 108. In a preferred embodiment, a plurality of radially disposed horizontal fins 110 are located at a level below the inlet 106.

In a preferred embodiment, the gas stream is from a biomass pyrolysis unit. The biomass pyrolysis reactor can be any type of reactor, including a bubbling fluidized bed reactor, circulating fluidized beds/transport reactor, rotating cone pyrolyzer, ablative pyrolyzer, vacuum pyrolyzer or auger reactor, and the like.

In alternate embodiments, the gas stream is from a coal gasification unit, a refinery process unit, or a chemical process unit. The biomass gas stream temperature typically ranges from about 100° C. to 1000° C., and may contain solids, such as char and ash, organic vapors and aerosols, water vapor and non-condensable gases, such as, but not limited to, hydrocarbons (methane, ethane, propane, etc.), hydrogen, carbon monoxide, carbon dioxide and nitrogen.

In alternate embodiments, the moving bed catalytic filter 100 can be used in low temperature applications that are above the dew point for any vapors that may be present in the gas stream or in the immediate atmosphere. As is known to one skilled in the art, operation at temperatures below the dew point may result in condensation of water or other liquids into the filter media 104, which will affect the operation of the moving bed catalytic filter 100.

The filter media 104 can be any of a wide variety of granular solid materials that are suited to remove one or more of the contaminants from the gas stream 106. In a preferred embodiment for use with pyrolysis oils, the filter media 104 may be sand, pebbles, or river rock. The filter media 104 is preferably of a size approximately in the range of 1/16 inch to 1 inch in diameter in order to keep the pressure drop experienced by the gas stream flowing through the filtration pile at a relatively low level. In this regard, it may be desirable for smaller or larger particles to be employed without concern for the resulting pressure drop depending upon the specific needs of the particular application. It is also understood that the specific filter media may be selected according to the temperature at which the moving bed filter 100 will be operated.

The flow rate of the filter media 104 typically corresponds with the flow rate of the gas stream entering at 106, the concentration of contaminants in the gas stream entering at 106, and the ability of the filter media 104 to capture the contaminant from the gas stream entering at 106. In general, the flow rate of the filter media 104 will be in approximately the range of 5-60 times the contaminant load supplied by the gas stream entering at 106. For instance, the mass flow ratio of the filter media 104 to the amount of contaminant at 106 can vary between 10 and 150.

The flow rate of the filter media 104 will be based at least partially upon economic factors, such as the increased material handling costs of employing increased flow rates for the filter media 104, and the economic result of capturing the contaminant from the gas stream such as compliance with applicable pollution regulations and reusing or selling the captured contaminant. It should be understood that the flow rate of the filter media 104 through the vessel 102 is preferably optimized in accordance with various considerations known to one skilled in the art.

The filter media 104 also includes a catalyst selected to achieve a desired reaction with the gas stream. In some embodiments, the filter media 104 is wholly a catalyst, wherein the catalyst is supported on a solid support that also functions in a filtering capacity. In some embodiments, the amount of catalyst in the filter media 104 can be any amount which would provide the desired results in the gas stream exiting the vessel 102 through outlet 108. In some embodiments, that amount may be 1, 5, 10, 20, 30, 40, 50, 60, 70, 80, 90, 95, 99 or 100 wt % or any wt % therebetween.

In some embodiments, the catalyst would need to be replaced or regenerated when it is no longer useful. If the catalyst is to be regenerated it may be done in-situ or in another processing unit. The catalyst may be regenerated by any suitable methods known to those skilled in the art. In some embodiments, regeneration may include removing coke by the combustion with steam and air. In other embodiments, the catalyst may be reduced by hydrogen or synthesis gas. In yet other embodiments, the catalyst may need to be pretreated prior to use with either sulfides or chlorine. For sulfiding, hydrogen sulfide may be used or other hydrogen sources such as diesel fuel can be used.

The catalyst can be any of a wide variety of catalyst materials that are suited to upgrade the gas stream entering the inlet 106. Examples of upgrading the gas stream include, but are not limited to, altering the chemical characteristics of the stream, including but not limited to increasing/lowering the molecular weight of the gas stream, reducing/increasing the amount of water in the stream, and reducing the oxygen content in the gas stream.

In a preferred operation, gas is introduced into the vessel 102 (aka filter shell) through inlet 106 after the granular media 104 has sufficiently filled the vessel 102. The arrows 112 (in FIG. 3) designate the general cyclonic path of the injected gas from inlet 106. This cyclonic path is created by virtue of the tangential location and direction of the gas inlet 106. As the gas approaches the fins 110, the cyclonic path of the gas is interrupted and is changed to a vertical direction as indicated by the arrows 114. The gas interfaces with the filter material 104 and begins to migrate upwardly through the filter material 104 as indicated by the arrows 116. The gas is cleansed by the filter material 104 as it moves upwardly against the downwardly flow of the filter material 104. Thus, the gas exiting through the outlet 108 is substantially cleaner than the gas that was entering the inlet 106, and since the filter material also comprised a catalyst (not shown), the gas is also chemically altered in some desired way.

As gas flows through the filter material 104, the granular bed is continuously flowing downward under the force of gravity. The granular bed flow rate is controlled using methods known to one skilled in the art.

In some embodiments, the gas stream exiting the outlet 108 will be further processed to collect condensed liquids. The condensed liquids can either be used directly as transportation fuel or may be upgraded to transportation fuel or used as feedstock for chemical production such as commodity chemicals, pharmaceuticals or plastics. The catalytic effect on the gas stream from the outlet 108 may be noticed in the condensed liquid by a product having a lower molecular weight, a lower oxygen content, a lower water content and/or variable speciation of organics than those gas streams not being catalytically treated. The gas stream is preferably contacted with the catalyst before condensation reactions can occur, preferably at temperatures ranging from about 200° C. to about 1000° C.

In an alternate embodiment, a gas may be injected into the vessel prior to or just after contacting the filter media 104. FIG. 3 also denotes possible locations for injection ports as 118. In some embodiments, the gas is hydrogen. In other embodiments, the gas may be ammonia or any other gas which would assist the catalyst in altering the chemistry of the organic species in the gas exiting the outlet 108.

In some embodiments, after appropriate residence time the filter media 104 exits the vessel 102 and is sent to the media cleaning system 160. In preferred embodiments, the filter media 104 containing catalyst is also regenerated in the media cleaning system 160. In alternate embodiments, the filter media 104 containing catalyst has the catalyst separated from the filter media 104 in the media cleaning system 160.

The catalyst may or may not require regeneration. In some embodiments, the filter media 104 may be removed and combusted in a controlled manner to remove coke and acquire the desired temperature for reinitiation into the vessel 102 in the media cleaning system 160. The combustion may occur in a fluid bed, fixed bed, plug flow bed, or similar combustion device.

The moving bed catalytic filter 100 can be used with numerous types of gas streams having numerous types of contaminants. In one embodiment, the moving granular bed filter 100 can remove fly ash from an exhaust gas stream of a coal-fired power plant. In such an application, the filter media 104 may be gravel, sand, pelletized fly ash, or other appropriate material. If the gas stream is an exhaust gas stream from a coal-fired power plant, it may also be desired to remove sulfur dioxide gas from the gas stream, wherein the filter media 104 may be a combination of limestone and dolomite. In such an application, the filter media may be regenerated or may simply be discarded.

The moving bed catalytic filter 100 of the present invention can be used in numerous types of applications. Examples of other applications for the moving bed catalytic filter 100 will be apparent to those knowledgeable in the relevant art. In some embodiments the moving bed catalytic filter will also include a media cleaning system which may be any of a variety of systems that are suited to removing particular contaminants from particular filter media 104 containing catalyst.

In yet other embodiments, there may be more than one moving bed catalytic filter 100. For example, a plurality of the moving granular bed catalytic filters 100 may arranged in either a series and/or parallel configuration.

While a number of particular embodiments of the present invention have been described herein, it is understood that various changes, additions, modifications, and adaptations may be made without departing from the scope of the present invention, as set forth in the following claims.

What is claimed is:

1. A method of simultaneously filtering and reacting a fluid stream, said method comprising passing a fluid stream through a moving granular bed filter that also comprises an upgrading catalyst, wherein the moving granular bed filter removes particulate matter from said fluid stream and wherein said catalyst simultaneously facilitates a reaction in said fluid stream.

2. The method of claim 1, wherein the filter material is selected from the group consisting of sand, gravel, metals, coal, coke, pelletized ash, pebbles, corundum, limestone, dolomite, glass, soda lime glass, polystyrene, activated charcoal, ceramic, anthracite, garnet, ilmenite, and activated charcoal.

3. The method of claim 1, wherein the fluid stream is exhaust from a biomass gasification or fast pyrolysis unit.

4. The method of claim 1, further comprising injection of gases to alter the chemical composition of the fluid stream.

5. The method of claim 4, wherein the gases are injected prior to filtering.

6. The method of claim 4, wherein the gases are injected just after filtering.

7. The method of claim 4, wherein the gases may be hydrogen or ammonia.

8. The method of claim 1, wherein the upgrading catalyst lowers the average molecular weight of the fluid stream.

9. The method of claim 1, wherein the upgrading catalyst alters the chemical speciation of the fluid stream.

10. The method of claim 9, wherein the fluid stream is altered by having a lower overall acid number.

11. The method of claim 9, wherein the fluid stream is altered by having a lower viscosity.

12. The method of claim 9, wherein the fluid stream is altered by having a lower oxygen content.

13. The method of claim 1, wherein the fluid stream is exhaust from a coal fired power plant gasification unit.

14. The method of claim 1, wherein the fluid stream is from a refinery processing unit.

15. The method of claim 1, wherein the fluid stream is from a chemical plant processing unit.

16. A composition comprising a moving granular bed filter material that is intimately admixed with an upgrading catalyst.

17. The composition of claim 16, wherein the upgrading catalyst is separate from the filter material.

18. The composition of claim 16, wherein the upgrading catalyst is absorbed or adsorbed to the filter material.

19. The composition of claim 16, wherein the upgrading catalyst is covalently bonded to the filter material.

20. A method of simultaneously filtering and upgrading a biomass gasification or pyrolysis fluid stream, comprising:
    passing a fluid stream through a moving granular bed filter comprising an upgrading catalyst,
    wherein said fluid stream comprises synthesis gas from a biomass gasification unit or bio-oil from a biomass pyrolysis unit,
    wherein the moving granular bed filter removes particulate matter from said fluid stream and
    wherein said upgrading catalyst simultaneously upgrades said fluid stream.

* * * * *